US012754626B2

(12) United States Patent
Lien et al.

(10) Patent No.: US 12,754,626 B2
(45) Date of Patent: Oct. 6, 2026

(54) PEN NIB MODULE AND CAPACITIVE STYLUS

(71) Applicant: EMRIGHT TECHNOLOGY CO., LTD., Hsinchu County (TW)

(72) Inventors: Chien-Chia Lien, Hsinchu County (TW); Ming-Hui Chou, Hsinchu County (TW)

(73) Assignee: EMRIGHT TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 19/324,140

(22) Filed: Sep. 10, 2025

(65) Prior Publication Data

US 2026/0161239 A1 Jun. 11, 2026

(30) Foreign Application Priority Data

Dec. 5, 2024 (TW) ................................ 113147193

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01); *G06F 2203/04105* (2013.01); *G06F 2203/04106* (2013.01)

(58) Field of Classification Search
CPC .. G06F 3/0383; G06F 3/03545; G06F 3/0441; G06F 2203/04105; G06F 3/0442; G06F 2203/04106
See application file for complete search history.

(56) References Cited

U.S. PATENT DOCUMENTS

| | | | | |
|---|---|---|---|---|
| 9,239,639 | B1 * | 1/2016 | Vanderet | G06F 3/03545 |
| 11,513,642 | B2 * | 11/2022 | Hashimoto | G06F 3/04162 |
| 2021/0089146 | A1 * | 3/2021 | Hashimoto | G06F 3/04162 |
| 2024/0053836 | A1 * | 2/2024 | Tanaka | G06F 3/03545 |
| 2024/0077959 | A1 * | 3/2024 | Chueh | G06F 3/0383 |

FOREIGN PATENT DOCUMENTS

| | | | | |
|---|---|---|---|---|
| TW | 201833738 A | 9/2018 | | |
| WO | WO-2025225213 A1 * | 10/2025 | | G06F 3/03 |

OTHER PUBLICATIONS

Electronic Pen (machine translation of WO 2025/225213 A1) (Year: 2025).*

* cited by examiner

*Primary Examiner* — Xuemei Zheng
(74) *Attorney, Agent, or Firm* — Winston Hsu

(57) ABSTRACT

A pen nib module applied to a capacitive stylus includes a pen nib component, a fixing component, and a pressure sensor. The pen nib component includes a non-conductive portion and a conductive portion connected to each other. The fixing component is disposed on an end of the conductive portion opposite to the non-conductive portion and includes a positioning portion and a supporting portion connected to each other. The conductive portion is mounted within the positioning portion, and the supporting portion is connected to an inner wall of the capacitive stylus. The pressure sensor is disposed on a surface of the supporting portion opposite to the positioning portion and is configured to sense deformation of the supporting portion.

13 Claims, 2 Drawing Sheets

PEN NIB MODULE AND CAPACITIVE STYLUS

BACKGROUND OF THE INVENTION

1. Field of the Invention

The present invention relates to a pen nib module and a capacitive stylus comprising the same, and more particularly, to a pen nib module capable of detecting pen tip pressure and a capacitive stylus incorporating such module.

2. Description of the Prior Art

As described in U.S. Pat. No. 10,768,7205, the conventional stylus includes a pen barrel, a pen nib, a spring and a pressure sensor. A recess is formed at the bottom of the pen barrel to receive and support the pressure sensor. The pressure sensor is supported by the inner wall of the recess. The pen nib is movably disposed inside the pen barrel, with its front end protruding from the pen barrel and its rear end abutting the pressure sensor. The pen nib is surrounded by the spring and disposed inside the pen barrel. When the use operates the conventional stylus for writing, the pen nib directly applies pressure to the pressure sensor, thereby compressing the spring. The pressure sensor receives the force exerted by the pen nib and generates a corresponding pressure value, which is used to determine whether a writing operation is being performed. When the user is not writing, the spring returns to its original shape, and there is a gap between the pen nib and the pressure sensor. The pressure value generated by the pressure sensor is disappeared to judge that the stylus is not in a writing action. However, the conventional stylus must allow the rear end of the pen nib enough freedom so that the rear end of the pen nib can contact the pressure sensor; the foresaid configuration makes the pen nib easy to shake excessively within the pen barrel. Therefore, design of a touch stylus that can effectively prevent the pen nib from shaking in the pen barrel is an important issued in the related mechanical design industry.

SUMMARY OF THE INVENTION

The present invention provides a pen nib module and a related capacitive stylus capable of detecting pen tip pressure for solving above drawbacks.

According to one embodiment, a pen nib module is applied to a capacitive stylus and includes a pen nib component, a fixing component, and a pressure sensor. The pen nib component includes a non-conductive portion and a conductive portion connected to each other. The fixing component is disposed on an end of the conductive portion opposite to the non-conductive portion and includes a positioning portion and a supporting portion connected together. The conductive portion is mounted in the positioning portion, and the supporting portion is connected to an inner wall of the capacitive stylus. The pressure sensor is disposed on a side of the supporting portion opposite to the positioning portion, and is adapted to sense deformation of the supporting portion.

According to another embodiment, a capacitive stylus includes a pen barrel, a circuit board, an energy storage component and a pen nib module. The circuit board is disposed inside the pen barrel and includes a controller. The energy storage component is disposed inside the pen barrel and is configured to supply energy to the circuit board. The pen nib module is detachably mounted in the pen barrel, and includes a pen nib component, a fixing component, and a pressure sensor. The pen nib component includes a non-conductive portion and a conductive portion connected to each other. The fixing component is disposed on an end of the conductive portion opposite to the non-conductive portion and includes a positioning portion and a supporting portion connected together. The conductive portion is mounted within the positioning portion, and the supporting portion is connected to an inner wall of the capacitive stylus. The pressure sensor is disposed on a side of the supporting portion opposite to the positioning portion and is configured to sense deformation of the supporting portion.

The capacitive stylus of the present invention includes the fixing component having the positioning portion and the supporting portion, both integrated into the pen nib module. The positioning portion is configured to support the pen nib component, and the supporting portion is formed as the thin sheet structure and positioned between the pen nib component and the pressure sensor. Therefore, the pressure sensor is configured to sense the deformation of the supporting portion (which means the thin sheet structure) to generate the pressure signal. At least one lateral side of the supporting portion is connected to the inner wall of the capacitive stylus via the engagement, adhesion, or mechanical fastening, thereby significantly reducing wobbling of the pen nib component during writing. At least one lateral sides of the supporting portion may be embedded into or engaged with the inner wall of the pen barrel to increase the overall rigidity of the fixing component, thereby preventing the pressure sensor from being damaged when the user applies excessive writing force. Besides, the pen nib component, the fixing component and the pressure sensor may be modularly designed, such that the pen nib module can be installed into any pen barrel as needed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
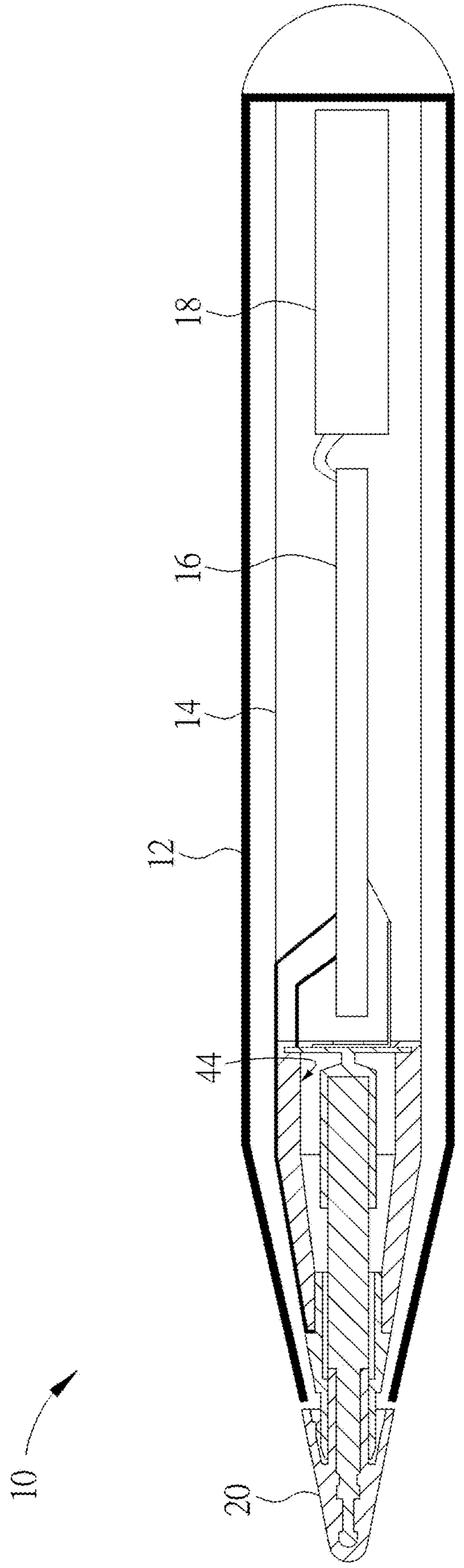
FIG. 1 is a schematic structural diagram of a capacitive stylus according to an embodiment of the present invention.

Please refer to FIG. 1. FIG. 1 is a schematic structural diagram of a capacitive stylus 10 according to an embodiment of the present invention. The capacitive stylus 10 may include a pen barrel 12, an internal holder 14, a circuit board 16, an energy storage component 18, and a pen nib module 20. The pen barrel 12 serves as the housing of the capacitive stylus 10 and may be made of a plastic or metal material. The material and color of the pen barrel 12 may vary depending on design requirements. The internal holder 14 is disposed inside the pen barrel 12 and is configured to support or interconnect various internal components of the capacitive stylus 10. The circuit board 16, the energy storage component 18, and the pen nib module 20 may be mounted inside the pen barrel 12 via the internal holder 14. The energy storage component 18 is configured to supply energy to the circuit board 16. A controller (not shown in the figure) disposed on the circuit board 16 is configured to receive and analyze electronic signals generated by the pen nib module 20, and may optionally transmit relevant data to an external electronic device via a wireless communication module (also not shown in the figure).

Figure 2:
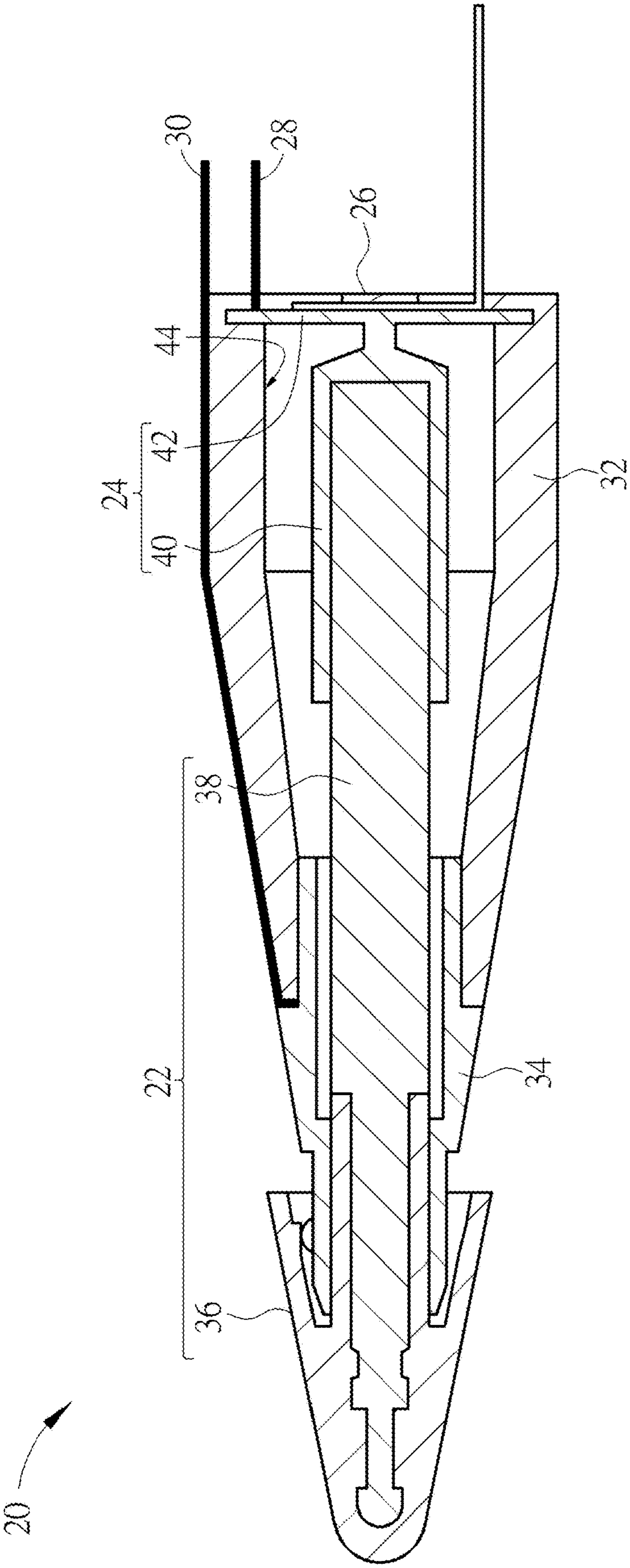
FIG. 2 is a schematic structural diagram of a pen nib module according to the embodiment of the present invention.

Please refer to FIG. 2. FIG. 2 is a schematic structural diagram of the pen nib module 20 according to the embodiment of the present invention. The pen nib module 20 is preferably detachably mounted within the pen barrel 12 and may include a pen nib component 22, a fixing component 24, a pressure sensor 26, a first signal wire 28, and a second signal wire 30. The internal holder 14 may include a support frame 32 and an induction component 34, both disposed at a location near the pen nib module 20. The pen nib component 22 is movably disposed inside the induction component 34, and includes a non-conductive portion 36 and a conductive portion 38 connected to each other. The non-conductive portion 36 may be made of a plastic material, and extends beyond the induction component 34 to protrude from the pen barrel 12. The conductive portion 38 is typically made of metal material, and is partially embedded within the non-conductive portion 36. A main body of the conductive portion 38 is positioned corresponding to the locations of the support frame 32 and the induction component 34.

In one embodiment of the present invention, the conductive portion 38 and the non-conductive portion 36 may have any structural combination, which means the conductive portion 38 and the non-conductive portion 36 may be configured as separate, non-integrated components. For example, the conductive portion 38 may be coupled to or detached from the non-conductive portion 36 by means of an engagement structure, a threaded connection, or a concave-convex structure, and the present invention is not limited to the aforementioned embodiments. When the non-conductive portion 36 of the capacitive stylus 10 becomes worn due to contact with the external device, the capacitive stylus 10 of the present invention may be easily replaced by removing and combining the non-conductive portion 36.

The fixing component 24 is disposed at an end of the conductive portion 38 opposite to the non-conductive portion 36, and includes a positioning portion 40 and a supporting portion 42 connected to each other. The corresponding end of the conductive portion 38 that is opposite to the non-conductive portion 36 is mounted within the positioning portion 40. The supporting portion 42 is connected to an inner wall 44 of the capacitive stylus 10. For example, at least two lateral sides of the supporting portion 42 may be engaged with or embedded into the inner wall 44. Preferably, the fixing component 24 is made of conductive material, and the supporting portion 42 is formed as a thin sheet structure. The thin sheet structure is capable of being deformed when the pen nib module 20 moves relative to the pen barrel 12.

The pressure sensor 26 may be disposed on a surface of the supporting portion 42 opposite to the positioning portion 40, which means the pressure sensor 26 and the positioning portion 40 are respectively located on opposite sides of the supporting portion 42. The pressure sensor 26 is configured to sense deformation of the supporting portion 42, which is formed as the thin sheet structure, caused by pressure applied from the pen nib module 20. In contrast to the prior art, when the conventional stylus is writing, the spring of the conventional stylus is compressed and the pressure sensor of the conventional stylus sends a related signal; when the conventional stylus is not writing, the spring is released to separate the pen nib from the pressure sensor, and the signal sent back by the pressure sensor is disappeared. Specifically, when the capacitive stylus 10 is writing, the supporting portion 42 is deformed by pressure applied from the pen nib component 22. The pressure sensor 26 mounted on the surface of the supporting portion 42 opposite to the positioning portion 40 can sense the deformation and transmits the corresponding signal. When the capacitive stylus 10 is not writing, no pressure is applied by the pen nib component 22, and therefore the supporting portion 42 remains undeformed. As a result, the pressure sensor 26 does not generate signals.

In one embodiment of the present invention, the first signal wire 28 may be electrically connected to the supporting portion 42 to transmit the electrical signals received via contact and induction from the external device, through the conductive portion 38 and the fixing component 24. However, the present invention is not limited thereto. In another embodiment, the second signal wire 30 may be electrically connected to the induction component 34 to transmit electronic signals sensed via contact with the external device. Again, the present invention is not limited in this regard. In other embodiment, the pressure sensor 26 may be electrically connected to the controller (not shown in the figures) on the circuit board 16 via a flexible flat cable, for transmitting the electrical signals generated by the pressure sensor 26. The above descriptions are provided by way of example and not intended to limit the scope of the present invention.

In conclusion, the capacitive stylus 10 of the present invention includes the fixing component 24, disposed within the pen nib module 20, and comprising a positioning portion 40 and a supporting portion 42. The positioning portion 40 is configured to support the pen nib component, and the supporting portion 42 is formed as the thin sheet structure and positioned between the pen nib component 22 and the pressure sensor 26. Accordingly, the pressure sensor 26 is configured to detect deformation of the supporting portion 42 (i.e., the thin sheet structure) and generate the corresponding pressure signal. At least one lateral side of the supporting portion 42 may be coupled to the inner wall of the capacitive stylus 10 by means of engagement, adhesion, or mechanical assembly, thereby significantly reducing wobbling of the pen nib component 22 during writing. When both lateral sides of the supporting portion 42 are embedded into the inner wall, the overall rigidity of the fixing component 24 can be enhanced, which helps prevent damage to the pressure sensor 26 when excessive writing force is applied. Furthermore, the pen nib component 22, the fixing component 24, and the pressure sensor 26 may be modularly designed, such that the pen nib module 20 can be installed into any pen barrel according to practical needs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pen nib module applied to a capacitive stylus, the pen nib module comprising:

a pen nib component comprising a non-conductive portion and a conductive portion connected to each other;

a fixing component disposed on an end of the conductive portion opposite to the non-conductive portion, the fixing component comprising a positioning portion and a supporting portion connected to each other, wherein the conductive portion is disposed inside the positioning portion, and at least one lateral side of the supporting portion is engaged with an inner wall of the capacitive stylus; and a pressure sensor disposed on a side of the supporting portion opposite to the positioning portion, and the pressure sensor being configured to sense deformation of the supporting portion.

2. The pen nib module of claim 1, wherein the fixing component is made of conductive material.

3. The pen nib module of claim 1, wherein the supporting portion is a thin sheet structure that is deformed when the pen nib module is subjected to an external force.

4. The pen nib module of claim 1, wherein the pen nib module further comprises a first signal wire electrically connected to the supporting portion and configured to transmit an electronic signal induced by contact with an external device.

5. The pen nib module of claim 1, wherein the pen nib module further comprises a second signal wire electrically connected to an induction component of the capacitive stylus and configured to transmit an electronic signal induced by contact with an external device.

6. The pen nib module of claim 1, wherein the pen nib module is detachably mounted within a pen barrel of the capacitive stylus.

7. The pen nib module of claim 1, wherein the non-conductive portion and the conductive portion are separate structures, and the non-conductive portion is assembled to the conductive portion through engagement, threaded connection, or a concave-convex structure.

8. A capacitive stylus, comprising:

a pen barrel;

a circuit board disposed within the pen barrel, and comprising a controller;

an energy storage component disposed within the pen barrel and configured to supply energy to the controller of the circuit board; and a pen nib module detachably mounted within the pen barrel, the pen nib module comprising:

a pen nib component comprising a non-conductive portion and a conductive portion connected to each other;

a fixing component disposed on an end of the conductive portion opposite to the non-conductive portion, the fixing component comprising a positioning portion and a supporting portion connected to each other, wherein the conductive portion is disposed within the positioning portion, and at least one lateral side of the supporting portion is engaged with an inner wall of the capacitive stylus; and a pressure sensor disposed on a side of the supporting portion opposite to the positioning portion, the pressure sensor being configured to sense deformation of the supporting portion.

9. The capacitive stylus of claim 8, wherein the fixing component is made of conductive material.

10. The capacitive stylus of claim 8, wherein the supporting portion is a thin sheet structure that is deformed when the pen nib module is subjected to an external force.

11. The capacitive stylus of claim 8, wherein the pen nib module further comprises a first signal wire electrically connected to the supporting portion and configured to transmit an electronic signal induced by contact with an external device.

12. The capacitive stylus of claim 8, wherein the pen nib module further comprises a second signal wire electrically connected to an induction component of the capacitive stylus and configured to transmit an electronic signal induced by contact with an external device.

13. The capacitive stylus of claim 8, wherein the non-conductive portion and the conductive portion are separate structures, and the non-conductive portion is assembled to the conductive portion through engagement, threaded connection, or a concave-convex structure.

* * * * *